United States Patent [19]

Adams

[11] 4,034,825

[45] July 12, 1977

[54] POWER ASSISTED VEHICLE STEERING

[75] Inventor: Frederick John Adams, Campton, England

[73] Assignee: Cam Gears Limited, Hitchin, England

[21] Appl. No.: 437,930

[22] Filed: Jan. 30, 1974

[30] Foreign Application Priority Data

Feb. 1, 1973  United Kingdom .............. 5048/73

[51] Int. Cl.² ......................................... B62D 5/08
[52] U.S. Cl. ............................. 180/143; 91/375 A
[58] Field of Search ................ 180/79.2 D, 79.2 R, 180/143; 91/375 A, 370, 371, 372, 373

[56] References Cited

U.S. PATENT DOCUMENTS

| | | | |
|---|---|---|---|
| 2,791,287 | 5/1957 | Stolte | 180/79.2 D |
| 3,171,298 | 3/1965 | Henry-Biabaud | 180/79.2 D |
| 3,406,773 | 10/1968 | Luther | 91/375 A X |
| 3,465,842 | 9/1969 | Hruska | 180/79.2 D |
| 3,833,081 | 9/1974 | Suzuki | 180/79.2 R |
| 3,930,554 | 1/1967 | Ward | 180/79.2 R |

*Primary Examiner*—Joseph F. Peters, Jr.
*Assistant Examiner*—John A. Pekar

[57] ABSTRACT

The invention described includes a detent arrangement which, subject to fluid pressure which is a function of road speed, engages and therefore varies the elastically effective length of the known torsion bar which controls the power-assistance valve of a power-assisted vehicle steering system, so as to vary the extent of power assistance from a maximum at no or low vehicle speed to a minimum at an increased speed.

10 Claims, 4 Drawing Figures

POWER ASSISTED VEHICLE STEERING

The invention relates to power assisted vehicle steering and in particular to the well known type of apparatus in which driver's torque transmitted through an elastic torsion bar connects the steering wheel to the road steering gear; torsional deflection of the bar produces a response in a rotational valve the operation of which thus reflects the magnitude and sense of the driver's torque to permit more or less flow of pressure fluid to the power assistance servomotor or equivalent hydraulic assist mechanism. There have been many proposals to enable the effective torsional response of such a device to be modulated according to vehicle speed, so that in effect the greater the vehicle speed the less the power assistance.

PRIOR ART

In an earlier proposal, means have been shown in which the elastically effective length of a torque bar in the well-known type of torsionally responsive hydraulic rotational valve has been progressively varied by the interposition between the torque-bar and a valve element of a spline or similarly engaging coupling which is axially movable by a piston, the piston being acted upon (against a spring which dictates the entire rate of operation) by fluid pressure which is a function of vehicle speed. In this prior proposal the coupling moves subject to two frictional resistances (and as a differential force of pressure and resilience), one between itself and splines or equivalent on the torque bar and the other between itself and splines or equivalent in the valve element. Although this may potentially afford a usefully progressive action (i.e., may theoretically progressively adjust the effective elasticity of the torque bar to reduce with increase of vehicle speed) it may be subject to considerable frictional effects — especially if speed changes whilst steering torque is being applied — and such may suddenly change, which may be inconvenient or even dangerous. Moreover it is not clear in such proposal, that there is a pressure-fluid source for power assistance which is effectively separate from the speed-sensitive source; nor is it proposed to use a speed-governor with a single pump; nor so to arrange the system that the factor of vehicle load could easily be introduced.

The present invention, whilst involving simple means to achieve its aims, is also adaptable in various ways. It may be adapted to use only one pressure-fluid source, e.g., an engine-driven pump, the required factor of vehicle speed being provided for by a speed-sensitive governor which may be merely a governor-controlled bypass restriction or throttle. It demands only very simple manufacture, no extraneous springs, and no accurately fitting piston arrangements nor does it involve any high frictional loads.

It is recognized in the art particularly of power-assisted steering of vehicles, that the effort applied by the operator (in the case of vehicles, "drivers") or steering wheel torque can be augmented in a proportional manner by deriving hydraulic energy from a source such as an engine-driven pump and controlling it by means of valve which, being rotational as a whole in the control operation, is actuated both in sense and extent by the elastic yield of a resilient member preferably a torsional element which we call a torque bar or rod. In simple cases the augmentation or power assistance is proportional to the driver's torque either directly or following a valve law which is determined by selecting port areas, increments of port overlap per degree of angle, and related parameters. However, particularly in the case of vehicle steering, it has also been recognized that more power assistance may be desirable at low speeds or even no speed (for example when maneuvring in heavy traffic, parking, etc.) than at high speeds; indeed to introduce power assistance at high speed may be dangerous, because the driver — at high speeds — should have to exert substantial effort to produce a given steering deflection as compared to his effort at low speed. The problem involved is one with which the invention of U.K. Pat. No. 1,293,192 is concerned; the present invention has a different approach to that problem.

According to the invention, a hydraulic powered control system such as a vehicle steering power-assisted system, of the kind having a torque-responsive valve to control the basic hydraulic power, has a secondary hydraulic power source of which the pressure is determined by vehicle speed or equivalent factor in such a way that the response of the valve when subjected to a given torque is diminished when the pressure is increased. The secondary power source may be derived from the same pump, or equivalent subject to vehicle-speed governing, as the basic power source, there being means whereby the pressure of the secondary source is modulated by the vehicle speed. However, the secondary power source may be a pump driven by the vehicle transmission so that its pressure is proportional to speed; but in such case the return line of the secondary system may join that of the basic system, a common reservoir being used. If the system be required to have "open center" characteristics, that is to say there is always some flow, this may be achieved by providing a short-circuiting line from the output to the input side of the secondary source this line having a restriction. Further the effect of such restriction may be variable in the manner of a throttle so that the effectiveness of the secondary pressure is controllable.

Further, the response of the torque-responsive valve above mentioned is, according to the invention, controlled by the provision of one or more mechanical detents which interlock the torque rod of the valve to the valve sleeve at a location (or locations) between the normally effective ends of the rod (or at one end thereof if the valve is to be locked inoperative). Thus for exmaple if there be such detent at the middle of the length of the rod, when operative it effectively (that is, interms of its elastic yield when subject to a given torque) halves the rod length and therefore halves the elastic yield for a given torque— and therefore in turn the relative movement of the two valve elements. Preferably each such detent is in the (paired) form of a ball or a ball plunger with a spherically profiled end, which is slidable like a piston (and may therefore be referred to, generally, as a piston element) in a radial bore of a valve element so as to engage in a convave recess, the contour of which may be designed to have a progressive cam-like effect, whereby either the inner valve element is locally locked to the rod or the two valve elements are interlocked, and the secondary hydraulic pressure acts on such ball or plunger to urge it into engagement with the recess with a force which is determined by the secondary pressure and therefore is determined by vehicle speed.

In a system constituted as above the invention may include the provision of two virtually separate hydraulic pressure systems. The basic system is the known power-assist system controlled by the rotational valve and operating the steering servomotor, and in addition there is a secondary system including a transmission-driven (i.e. speed-responsive) pump or souce, preferably supplied from the same reservoir as the basic system, the output of which goes to a chamber within the valve or valve body, in which its pressure acts upon the detent balls or plungers to the effect above stated. Leakage past the balls if such be used, flows back through appropriate channels to join the return flow of the basic system. The pressure source (e.g., pump) of the secondary system may as above stated, be short-circuited (i.e., its pressure side is connected to its input side) by a line in which there is a restriction; this has an effect similar to that of an open-centre valve in that there is always some flow through the secondary pump. The restriction may be varied by driver's control, whereby the effect of the secondary hydraulic system in controlling the valve is itself subject to control.

The pressure source may be common to both the basic and the secondary systems, e.g., may be an engine-driven pump, and the secondary system in such case will have its pressure governed by a speed responsive device such as a centrifugal governor which is transmission driven.

The accompanying drawings illustrate two examples of the invention. Both are sectional drawings illustrating the essentials of the device.

Figure 1:
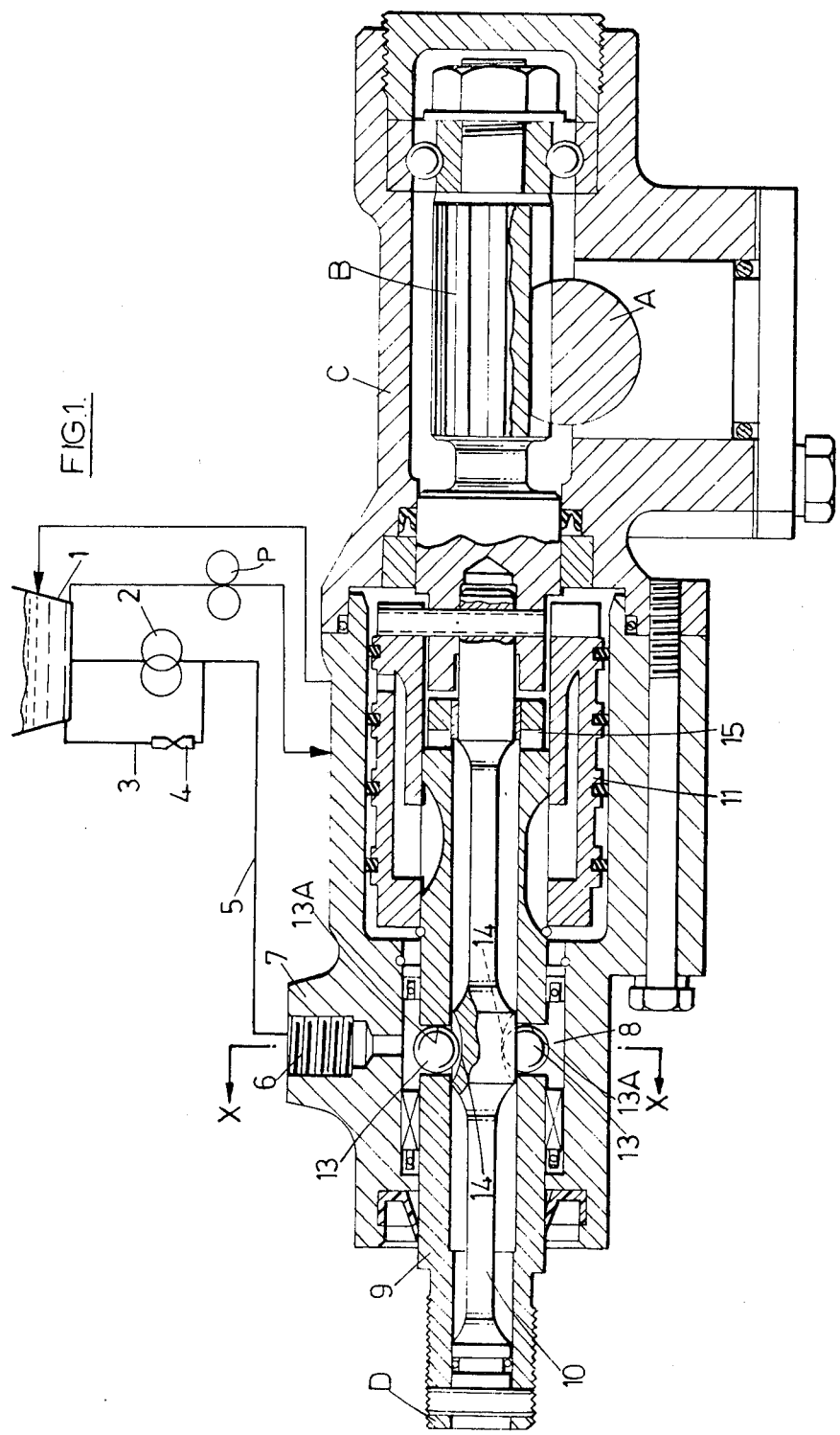
FIGS. 1 and 1A illustrate a longitudinal section and cross section on line X—X thereof, of a form in which the torque response of the valve is about halved when a certain secondary (speed responsive) pressure is reached.
Figure 1A:
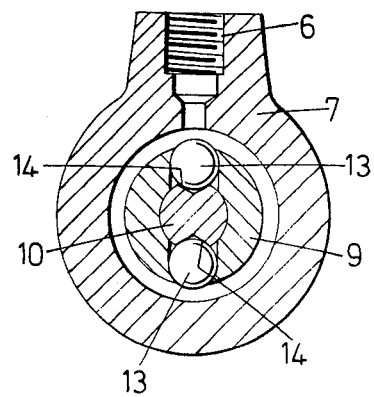

Some of the elements in the drawings will be recognizable by those familiar with power-assisted vehicle steering systems, and detailed description thereof is therefore unneccesary.

In both Figures the device is applied to rack and pinion vehicle steering with rack-bar A driven by pinion B in a steering box C, the driver's wheel being connected by a steering column (not shown) to an input shaft D. The usual bearings, glands, and like details are of course provided. In each example, the basic hydraulic system can include an engine-driven pump P supplied by a reservoir 1 to which its output flow ultimately returns.

A secondary pump 2, driven off the vehicle propeller shaft or otherwise in accordance with vehicle speed, is also supplied from reservoir 1. The pump 2 is short-circuited by a line 3 in which there is a driver-adjustable restriction indicated at 4. This short-circuit not only gives the secondary system some of the character of an open-circuit system but enables the driver to select the speed at which power assistance is reduced. The secondary system has a main pressure line 5 leading by union 6 into the valve body 7 which is preferably integrated with the steering box C. Within the body 7, the secondary fluid enters an annular chamber 8 which surrounds the inner rotating valve sleeve 9 which is rotatable by the shaft D. The sleeve 9 in turn surrounds the torque bar 10 which inter-connects the input shaft D and pinion B.

Towards one end, the sleeve 9 is surrounded by the outer valve sleeve 11, journalled on to sleeve 9. Usual valve passages and lands are provided so that relative rotation of sleeves 9 and 11 control the assistance pressure flow in the basic system.

Exposed in the chamber 8 are two diametrically opposite detent balls 13 which are a close but sliding fit in bores 13A through the wall of the sleeve 9. Between these bores 13A the rod 10, somewhat enlarged in diameter in this region, has concave dimples or recesses 14 into which the balls 13 can intrude: their intrusion is due to pressure in the chamber 8. Leakage past the balls 13 in the bores 13A escapes along the valve assembly to an annular passage 15 where it escapes to join the return flow of the basic system, and thus to the reservoir 1.

If the vehicle is stationary, the pump 2 is of course inoperative and the balls 13 are free. As pressure from pump 2 increases by reason of vehicle speed increase, the detent balls 13 are urged radially inwardly to engage the recesses 14. In the extreme, the balls can actually lock the sleeve 9 to the rod 10, and, as is visible, thus effectively halve the length of the rod. The recesses 14 may be profiled so as to provide a chosen relationship between this effect and the secondary pressure, so that the drop of the resilience characteristic may be gradual, and therefore the decrement of power-assistance with increment of speed can be graduated.

If it should be required, more than one set of detent balls might be provided, and spring-resistance can then be used to cause them to act in a sequence; for example, power assistance might be halved at about 40 m.p.h. and eliminated at 80 m.p.h.

Figure 2A:
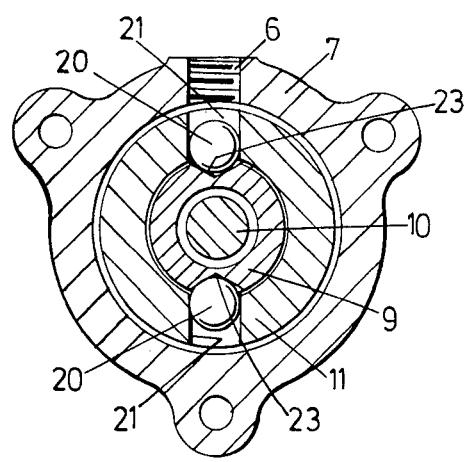
FIG. 2 and 2A are similar views of a form in which the torque-response of the valve is eliminated when a certain secondary pressure is reached.
Figure 2:
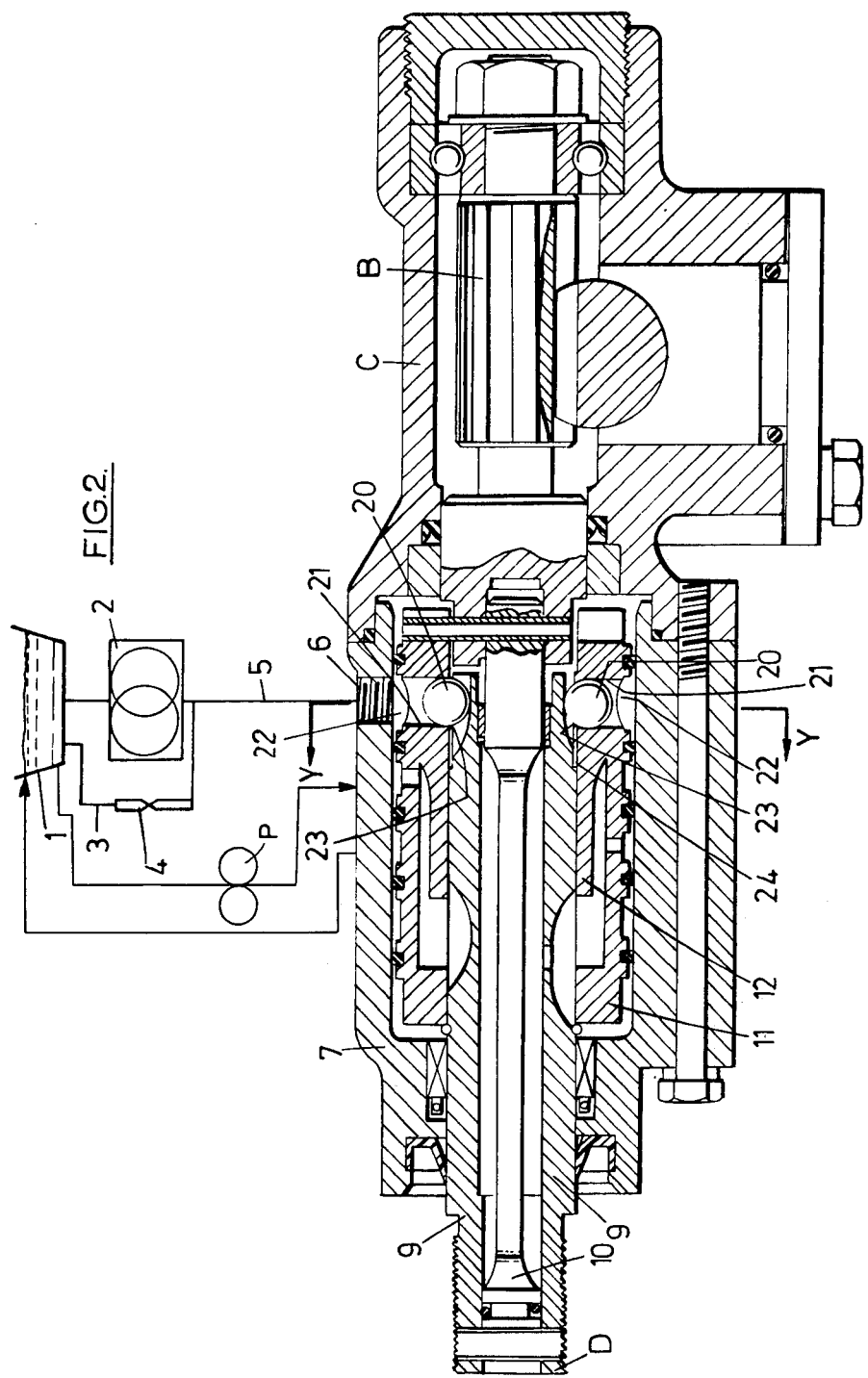

Turning now to FIGS. 2, 2A, similar parts have the same references. In this example the resilient effect of the servo-assistance valve is eliminated at a selected speed, rather than being merely reduced as in the FIG. 1 case. In other words, there will be power-assistance once a certain vehicle speed is exceeded. When "eliminated" is said, it is to be taken to mean considerably modified; as has been stated in relation to FIG. 1, the balls may actually interlock the valve element 9 with the torque bar 10 or have a progressively interlocking effect dependent upon selectable factors such as the actual shape of the recesses 23.

In FIGS. 2, 2A, a pair of detent balls 20 are caged in bores 21 in the thick end part of the outer valve sleeve 11, there being an annular chamber 22 for their pressure-fluid supply. The inner valve sleeve 9 is provided with recesses 23 for engagement by the balls 20. In this second example, the recesses 23 may again be so profiled as to have a progressive detent effect.

In place of the secondary pump 2 in either example, the line 5 may be supplied from the basic power-assistance pump, the supplied fluid pressure being governed for example by a speed-sensitive governor. A governor which may be suitable when adapted to this purpose, may be such as that which is to be seen in our United Kingdom Pat. No. 1,293,192 but there are many suitable types. Again the secondary system of the invention may be supplied by the basic pump acting through a ram, or differential-area piston device, the operation of which is opposed by a speed-sensitive pump or a speed-controlled valve.

It can be seen that if owing to high speed, the steering has become more or less direct and a sudden excessive steering force occurs (e.g. due to a burst tyre) the driver might exert such high torque that the detent device constituted by the balls 13 or 20 would "break out" and power assistance would resume.

I claim:

1. A power assisted vehicle steering assembly comprising: a steering gear having a driving and a driven gear; a fluid servo mechanism operatively associated with said driven gear for providing assist thereto; a fluid control valve having a first portion operatively associated with said driving gear and a second portion operatively associated with the first valve portion to control fluid flow to said servo mechanism and adapted for manual actuation; a resilient member normally interconnecting the first and second valve portions permitting a relative displacement therebetween in response to manual actuation; locking means for selectively preventing relative displacement between said valve portions by interconnecting the first and second valve portions to eliminate the resilient member connection between said first and second valve portions; and means for controlling said locking means.

2. The vehicle steering assembly of claim 1 wherein the means for controlling the locking means is responsive to the speed of the vehicle.

3. The vehicle steering assembly of claim 1 wherein the means for controlling the locking means is responsive to a hydraulic pressure signal.

4. A power assisted vehicle steering system comprising: a steering gear having a driving and a driven gear; a hydraulic assist mechanism which is operatively associated with one of said driving or driven gears; a hydraulic control valve, said valve having a first portion associated with said driving gear and a second portion operatively associated with said first portion and adapted for limited displacement relative to the first portion for selectively controlling pressurized fluid flow to said assist mechanism; a resilient member normally interconnecting said first and second valve portions and resisting relative displacement therebetween; locking means operatively interconnecting said first and second valve portions and responsive to vehicle speed for increasing the resistance to relative displacement between the first and second valve portions in direct proportion to the velocity of the vehicle, said locking means comprising a cam surface on the outer periphery of the second valve portion, an opening in the first valve portion and a piston element located in the opening in the first valve portion and in contact with the cam surface of the second vlave portion; and a fluid pressure pump responsive to vehicle velocity and connected to means to supply its pressure fluid to said piston element thereby biasing said element against the cam surface of the second valve portion with a force that varies directly as a function of vehicle velocity.

5. The vehicle steering assembly of claim 4 wherein the means responsive to vehicle speed for increasing the resistance to relative displacement between the first and second valve portions is actuataed by a hydraulic pressure signal.

6. A power assisted vehicle steering system comprising a steering gear having a driving and a driven gear, a hydraulic assist mechanism for assisting movement of said driven gear, a rotational valve including relatively displaceable first and second valve elements, relative displacement of which regulates the supply of pressure fluid from a speed responsive source to the assist mechanism, an elastic torque bar interconnecting said first and second valve elements and operatively associated with said driving gear for transmitting steering torque thereto, detent means including a radially shiftable piston element comprising balls movably carried by one of said valve elements in cylinders radially formed therein and adapted, when subjected to fluid pressure, to be urged radially inwardly towards said torque bar;

formations defining openings in one of said valve elements and recesses in said torque bar, said openings and recesses cooperatively acting to engage with said radially shiftable piston element; and means to lead said pressure fluid from said speed responsive source to act upon said detent means so as to interlock said one of said valve elements with said torque bar thereby to reduce the effective torsional elasticity of the torque bar between said first and second valve elements whereby relative rotation between said first and second valve elements in response to said steering torque is reduced.

7. A power assisted vehicle steering system comprising a steering gear having a driving and a driven gear, a hydraulic assist mechanism for assisting movement of said driven gear, a rotational valve including relatively displaceable first and second valve elements, relative displacement of which regulates the supply of pressure fluid from a vehicle speed responsive source to the hydraulic assist mechanism, an elastic torque bar interconnecting said first and second valve elements and operatively associated with said driving gear for transmitting steering torque thereto, locking means comprising movable elements and formations cooperative therewith, means to conduct a pressure fluid to said moveable elements, said movable elements being carried by one of said valve elements and said formations being located on said torque rod at spaced intervals therealong, said movable elements being adapted, when subjected to a predetermined fluid pressure, to engage one or more of said formations so as to lock incremental portions of said torque rod to said valve element, thereby reducing incrementally the effective torsional elasticity of the torque rod between said first and second valve elements whereby relative displacement therebetween in response to steering torque is reduced in predetermined increments.

8. A system according to claim 7 wherein said movable elements have profiled portions and said formations have cam surfaces whereby when said movable elements are subjected to said pressure fluid said profiled portions are biased against said cam surfaces with a force that varies directly as a function of vehicle speed so as to progressively engage and ultimately lock said incremental portions of said torque rod thereby progressively attaining the incremental reductions in torsional elasticity.

9. A power assisted vehicle steering system comprising a steering gear having a driving and a driven gear, a hydraulic assist mechanism for assisting movement of said driven gear, a rotational valve including relatively displaceable first and second valve elements, relative displacement of which regulates the supply of pressure fluid from a vehicle speed responsive source to the assist mechanism, an elastic torque bar interconnecting said first and second valve elements and operatively associated with said driving gear for transmitting steering torque thereto, means for progressively reducing the effective torsional elasticity of the torque bar between said first and second valve elements whereby relative rotation between said first and second valve elements in response to said steering torque is progressively reduced, said means comprising a detent including a radially shiftable piston element having a profiled portion and movably carried by one of said valve elements and adapted, when subjected to fluid pressure, to be urged radially inwardly toward said torque bar;

formations defining openings in one of said valve elements and cam surface recesses in said torque bar, said openings and cam surface recesses cooperatively acting to engage with said radially shiftable piston element whereby said profiled portion of said piston element is biased against said cam surface recesses with a force that varies directly as a function of vehicle speed; and means to lead said pressure fluid from said speed responsive source to act upon said detent means so as to progressively engage and ultimately interlock said one of said valve elements with said torque bar.

10. A power assisted vehicle steering system as defined in claim 9 wherein said detent and cooperative recesses are located between the ends of said torque bar, and wherein said detent comprises balls carried by one of said valve elements.

* * * * *